United States Patent
Johnson

(10) Patent No.: US 7,089,354 B2
(45) Date of Patent: Aug. 8, 2006

(54) DISK FRAGMENTATION TEST SYSTEM

(75) Inventor: Michael Joseph Johnson, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 330 days.

(21) Appl. No.: 10/630,527

(22) Filed: Jul. 30, 2003

(65) Prior Publication Data

US 2005/0027934 A1 Feb. 3, 2005

(51) Int. Cl.
*G06F 12/00* (2006.01)
(52) U.S. Cl. ................................. 711/112; 711/170
(58) Field of Classification Search ............... 711/170, 711/112, 154; 707/205, 206
See application file for complete search history.

(56) References Cited

U.S. PATENT DOCUMENTS

| 5,193,168 A | 3/1993 | Corrigan et al. |
| 5,247,660 A | 9/1993 | Ashcraft et al. |
| 5,671,402 A | 9/1997 | Nasu et al. |
| 5,727,185 A | 3/1998 | Mechner |
| 5,778,392 A | 7/1998 | Stockman et al. |
| 5,857,101 A | 1/1999 | Ballard et al. |
| 6,249,844 B1 | 6/2001 | Schloss et al. |
| 2003/0204535 A1 * | 10/2003 | Harada ........................ 707/200 |

* cited by examiner

Primary Examiner—Hiep T. Nguyen
(74) Attorney, Agent, or Firm—Sawyer Law Group LLP

(57) ABSTRACT

Disclosed is a method for preparing a disk drive of a computing system for test, including the steps of recording a plurality of test files to a partition of the disk drive until a free space of the partition is less than a predetermined value; and thereafter deleting a portion of the plurality of test files from the partition. A computer program product including a computer readable medium carrying a program for preparing a disk drive of a computing system for test, the computer program product having code for recording a plurality of test files to a partition of the disk drive until a free space of the partition is less than a predetermined value; and code for deleting a portion of the plurality of test files from the partition.

8 Claims, 2 Drawing Sheets

DISK FRAGMENTATION TEST SYSTEM

FIELD OF THE INVENTION

The present invention relates generally to fragmenting a storage device of computing system, and more specifically to fragmenting a hard disk used in a computing system under test.

BACKGROUND OF THE INVENTION

The tendency of files recorded onto a hard drive of a computing system to become fragmented over time is well known. It is recognized, qualitatively, that hard drive fragmentation reduces a speed of certain disk input/output (I/O) operations. Users of many types of computing systems are instructed to periodically use disk defragmentation tools to help address performance degradation arising from fragmented files written to and accessed from the hard drive. Since these tools are not available on all platforms, and the frequency and/or timeliness of application of these tools is not assured in many environments, it is likely that some degree of fragmentation exists on most consumer systems.

However, in planning machine requirements or server capacity, particularly for new system designs, allowance is made for some degradation of disk I/O performance over time. The magnitude of the performance degradation related to varying degrees of fragmentation is not at all known, and it is very difficult to determine, a priori, what specific effect will be manifested for a specific degree of fragmentation. In some cases, a degree of file fragmentation that causes little degradation can cause extreme degradation in another environment.

Part of the difficulty in evaluating the relationship between disk I/O performance and file fragmentation is that a response time of any given software or hardware function may depend upon a wide variety of factors, not just disk I/O performance. For example, network turnaround, physical device wait conditions, multithread locks, or human operator interaction may dominate the performance of a particular function.

U.S. Pat. No. 5,778,392 describes an algorithm that scatters files already existing on a disk across a disk in order to fragment it. U.S. Pat. No. 5,857,101 describes a method for breaking files into fragments in order to store them in page-accessed order. U.S. Pat. No. 5,727,185 includes a method for subdividing available storage into two or more categories with the ability to shift free space between the categories.

Accordingly, what is needed is a system and method for intentionally producing varying degrees of hard file fragmentation on a hard drive of a test system to assist in the evaluation and measurement of disk I/O performance as a function of file fragmentation. The present invention addresses such a need.

SUMMARY OF THE INVENTION

Disclosed is a method for preparing a disk drive of a computing system for test, including the steps of recording a plurality of test files to a partition of the disk drive until a free space of the partition is less than a predetermined value; and thereafter deleting a portion of the plurality of test files from the partition. A computer program product including a computer readable medium carrying a program for preparing a disk drive of a computing system for test, the computer program product having code for recording a plurality of test files to a partition of the disk drive until a free space of the partition is less than a predetermined value; and code for deleting a portion of the plurality of test files from the partition.

By selectably fragmenting files of a hard drive used in a test computing system, performance effects of progressively worse fragmentation may be easily evaluated and measured, allowing a system designer to potentially reduce, minimize or eliminate some or all of the negative effects of fragmentation.

DETAILED DESCRIPTION

The present invention relates to purposeful fragmentation of files of a hard drive in a test system used to evaluate and measure disk I/O performance as a function of degrees of fragmentation. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
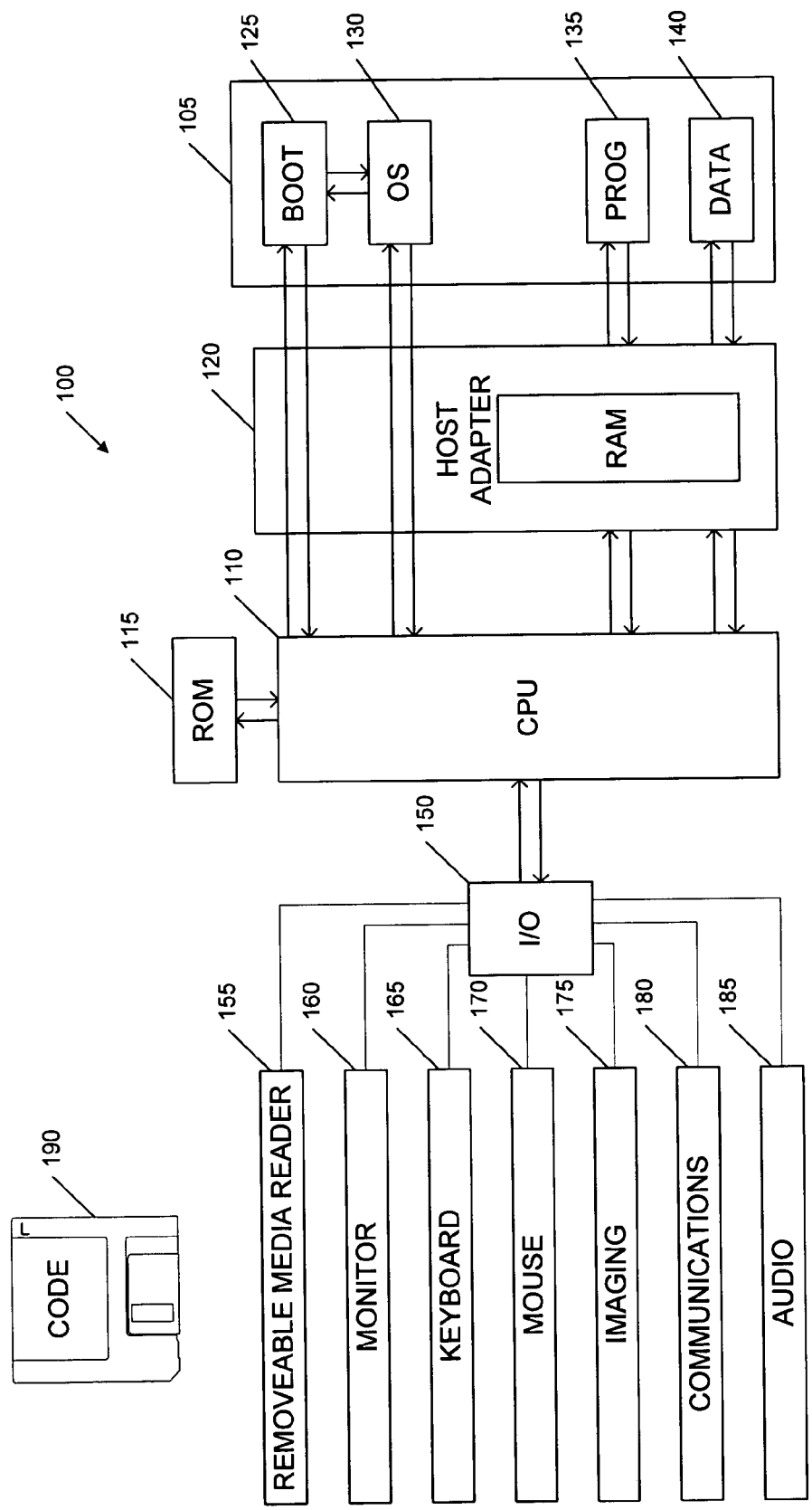
FIG. 1 is a schematic block diagram of a preferred embodiment for a test computing system including a hard drive to be fragmented.

FIG. 1 is a schematic block diagram of a preferred embodiment for a test computing system 100 including a hard drive 105 to be fragmented. Computing system 100 further includes a central processing unit (CPU) 110 coupled to a read-only memory (ROM) 115 for controlling hard drive 105 through a host adapter 120 communicating with an integrated drive electronics (IDE) controller manufactured into hard drive 105.

Hard drive 105 typically provides its storage volume divided into one or more logical partitions that may be treated as independent drives by computing system 100. Hard drive 105 has a primary partition that may be designated as being bootable, meaning it includes a boot sector 125 including instructions for initializing the desired operating system. Hard drive 105 often may also include files for an operating system (OS) 130, one or more program(s) 135 and/or data 140. Computer system 100 further includes an input/output (I/O) system 150 that incorporates necessary controllers for transferring data between CPU 110 and other components. These components may include a removable media reader 155 (e.g., floppy diskette drive or optical disk drive—reader and/or writer), a monitor 160, a keyboard 165, a pointing device 170 (mouse, trackball, pen/stylus), an imaging system 175 (scanner, camera, printer), a communications system 180 (network, modem, wireless) and/or an audio system 185. Computing system 100 may include one or more of some of the components depending upon the intended uses and implementations. A computer readable medium 190 (e.g., a floppy disk) may store instructions and program code elements in a non-volatile format that are executable by CPU 110 to implement an embodiment of the present invention. These elements may be accessed through one of the components, or stored, in some alternate preferred embodiments, on one or more partitions of hard drive 105. The preferred embodiment is described in terms of fragmenting files on hard disk 105 for ease in description. It is understood that the term hard disk includes other types of storage devices that record file information in similar fashion, and includes sub-divisions of such devices (e.g., logical partitions treated as independent hard drives by the OS).

In operation, when computer system 100 is started, basic input-output settings (BIOS) stored in ROM 115 activate basic I/O devices (e.g., hard disk 105, CPU 110, media reader 155, monitor 160, keyboard 165, and mouse 170). As CPU 110 gets activated, it is instructed to access one or more memory locations to begin the process of starting the OS. Typically, CPU 110 is directed to boot sector 125 of hard drive 105 to initialize OS 130. Boot instructions and/or OS 130 may be provided in other non-volatile memory locations of computer system 100, including medium 190.

OS 130 controls the overall operation of computing system 100 and activates all the I/O systems and communicates between a user and computing system 100 and the various subsystems. Programs and data used in computing system 100 are recorded on hard disk 105 and accessed in response to OS 130 and/or user interactions with computing system 100. The files on hard disk 105 are recorded in addressable units established on the recordable medium. It is rare for the size of any particular file and the size of the addressable unit to exactly match. When the file size is smaller, the unit is partially filled. When the file size is larger, multiple units are used to store the entire file contents. Computing system 100 keeps track of which units, and in which order, define each stored file.

Preferably, all the units of a file are recorded in contiguous physical locations so the medium reading mechanism does not need to reposition itself to read the units in the proper order. Files written onto a newly formatted hard disk are often written in such fashion, with the partition free space filled in a particular order as established in the configuration of computing system 100. However, once a file is deleted, freeing a certain number of units, it is purely coincidental whether a new file to be written uses exactly the same number of units. If a file needing fewer units is written, a "space" is left. Eventually a file will be written that does not fit into the space, so the file is split into two or more pieces and written into non-contiguous spaces. During ordinary use, many files are written and deleted, resulting in more and more files being recorded into non-contiguous spaces. This characteristic of files being recorded in non-contiguous spaces is referred to as fragmentation. The present invention purposefully fragments files of a partition of hard disk 105 to enable the evaluation and measurement of the performance of hard disk 105 and/or computing system 100 with hard disk 105 in varying degrees of fragmentation.

Figure 2:
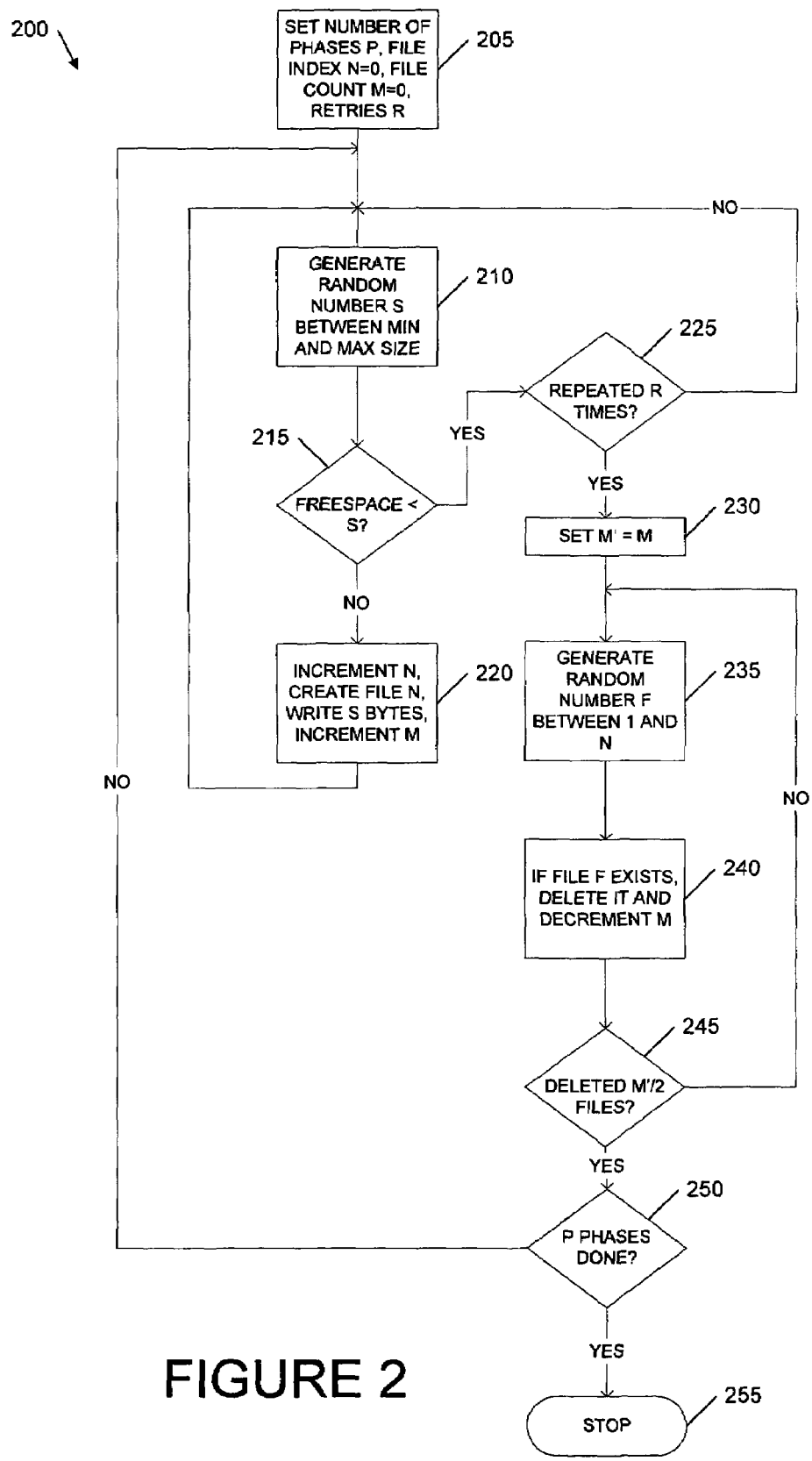
FIG. 2 is schematic block diagram of a preferred embodiment for a hard disk fragmentation control process.

FIG. 2 is schematic block diagram of a preferred embodiment for a hard disk fragmentation control process 200. Process 200 begins with an initialization step 205 that sets: (i) a number of desired phases "P", (ii) a file index "N" to zero, (iii) a file count "M" to zero, and (iv) a repetition number "R" for file write cycle retries. In the preferred embodiment, P is three and R is ten, though other values may be used in different implementations.

After initialization step 205, process 200 generates a random number S at step 210. S is preferably uniformly distributed between a MIN file size and a MAX file size, with MIN set equal to one byte and MAX set equal to fifty Megabytes for the preferred embodiment.

Process 200 next, step 215, tests whether a current freespace on the hard disk is less than S. If the freespace is not less than S, process 200 advances to step 220 from step 215, otherwise process 200 advances to step 225 when the freespace is less than S.

Step 220 increments N, creates file N, writes S bytes to newly created file N, and increments M. Thereafter, process 200 returns to step 210. Step 210 through step 220 constitute the file write cycle of a phase of process 200. The test at step 225 determines whether the file write cycle tried R times to generate S less than the freespace. If not, process 225 returns to step 210 to begin another file write cycle. When the test at step 225 is positive and R retries have been made, the write cycle of a phase of process 200 is complete and process 200 begins a file delete cycle at step 230.

Step 230 sets M' equal to M. Next, step 235 generates a random number "F" between one and N. Thereafter, process 200 deletes file F (if it exists) and decrements M (if file F existed) at step 240. The deletion sequence is different from both the recording sequence and a reverse of the recording sequence. Process next, step 245, tests whether M'/2 files have been deleted. If not, process 200 returns to step 235 and if it has, process 200 concludes the file delete cycle and advances to step 250.

Step 250 tests whether the P number of phases have been completed. If not, process 200 returns to step 210 to begin another file write cycle and if they have, process 200 stops at step 255.

With the values set as specified above, process 200 fragments the files on a hard disk to realistically duplicate the condition of the files of the hard disk had the hard drive been used over the course of months and/or years in typical types of environments. This realistic fragmentation is achieved in a few phases, with the free space fragmented after the first phase, and the files heavily fragmented after successive phases. After each phase, the hard disk is roughly one-half full.

For the preferred embodiment, P is three and R is ten, though other implementations may use a different number of phases and write cycle repetitions. The purpose of the R repetitions is to inhibit process 200 from leaving a large block of unwritten freespace at the completion of the write cycle, while helping to ensure that files generated near the end of the write cycles still have approximately the same statistical characteristics as the other generated files. Setting R equal to ten provides ten chances to pick random sizes S small enough to fit in the freespace available at the beginning of each phase. File sizes generated in any subsequent phase have a roughly ten percent chance of fitting into the left at the end of the current phase. In other words, ninety percent of the files generated in the subsequent phase will be too large to fit into the region(s) left unfragmented by the current phase (a desired result). Assuming hard disk size is large compared to MAX, the approximately nine "extra" chances at selecting a suitable size S will not severely affect the average file size, considering the average over the whole disk. However, if R were very large (e.g., a million), then the hard disk would end up with thousands of tiny files that would fill the free space completely but would severely skew the average file size, making the result unrealistic as a representation of extended hard drive usage. In some implementations it may be desirable to achieve such a result however, but it is not the desired outcome of the preferred embodiment.

The present invention for a monitoring service may be provided as a computer program product that may include a machine-readable medium having stored thereon instructions that can be used to program a computer (or other electronic devices) to perform a process according to the present invention. The machine-readable medium may include, but is not limited to, floppy disks, optical disks, CD-ROMS, magneto-optical disks, ROMS, RAMS, EPROMS, EEPROMS, magnetic or optical cards, or any type of media/machine-readable medium suitable for storing electronic instructions.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for preparing a disk drive of a computing system for test in a plurality of phases, each phase comprising:
   a) recording a plurality of test files of varying sizes to a partition of the disk drive in a recording sequence until a free space of the partition is less than a predetermined value; and thereafter
   b) deleting a portion of the plurality of test files from the partition in a deletion sequence, the deletion sequence being different from both the recording sequence and a reverse of the recording sequence.

2. The method of claim 1 wherein a processing phase comprises step a) and step b), the method further comprising the steps of:
   c) measuring a performance parameter of the disk drive prior to the processing phase; and
   d) measuring the performance parameter after the processing phase.

3. The method of claim 2 further comprising the steps of:
   e) performing a second processing phase after step d); and
   f) measuring the performance parameter after the second processing phase.

4. The method of claim 1 wherein the recording step a) comprises:
   a1) generating a random number uniformly distributed between a minimum file size and a maximum file size;
   a2) creating a next test file;
   a3) writing the random number bytes to the next test file; and
   a4) repeating steps a1)–a3) until the free space of the partition is less than the random number; and
   a5) repeating steps a1)–a4) a predetermined number of times.

5. The method of claim 4 wherein the predetermined number of times equals ten.

6. The method of claim 4 wherein the deleting step b) comprises the steps of:
   b1) generating a second random number between one and a maximum number of test files;
   b2) deleting the second random number test file when it exists; and
   b3) repeating steps b1)–b2) a second predetermined number of times.

7. The method of claim 6 wherein the second predetermined number of times is equal to one-half the number of test files present prior to the deleting step b).

8. A computer program product comprising a computer readable medium carrying program codes executable by a computer for preparing a disk drive of a computing system for test, the computer program product comprising:
   program codes for recording a plurality of test files of varying sizes to a partition of the disk drive in a recording sequence until a free space of the partition is less than a predetermined value; and
   program codes for deleting a portion of the plurality of test files from the partition in a deletion sequence, the deletion sequence being different from both the recording sequence and a reverse of the recording sequence.

* * * * *